US 9,985,499 B2

(12) United States Patent
Boehm et al.

(10) Patent No.: US 9,985,499 B2
(45) Date of Patent: May 29, 2018

(54) GENERATOR UNIT

(71) Applicant: Deere & Company, Moline, IL (US)

(72) Inventors: Barbara Boehm, Heidelberg (DE); Rainer Gugel, Plankstadt (DE)

(73) Assignee: DEERE & COMPANY, Moline, IL (US)

(*) Notice: Subject to any disclaimer, the term of this patent is extended or adjusted under 35 U.S.C. 154(b) by 19 days.

(21) Appl. No.: 15/134,923

(22) Filed: Apr. 21, 2016

(65) Prior Publication Data
US 2016/0322885 A1 Nov. 3, 2016

(30) Foreign Application Priority Data

Apr. 30, 2015 (DE) .................. 10 2015 208 077

(51) Int. Cl.
| F02B 63/04 | (2006.01) |
| H02K 7/10 | (2006.01) |
| H02K 7/18 | (2006.01) |
| A01B 71/02 | (2006.01) |
| B60K 25/06 | (2006.01) |
| A01D 69/02 | (2006.01) |
| H02K 7/116 | (2006.01) |
| H02K 9/19 | (2006.01) |
| H02P 9/00 | (2006.01) |
| B60K 17/28 | (2006.01) |

(Continued)

(52) U.S. Cl.
CPC ........... *H02K 7/1807* (2013.01); *A01B 71/02* (2013.01); *A01D 69/025* (2013.01); *B60K 17/28* (2013.01); *B60K 25/06* (2013.01); *F02B 63/04* (2013.01); *H02K 7/116* (2013.01); *H02K 9/19* (2013.01); *H02P 9/00* (2013.01); *B60K 25/00* (2013.01); *B60Y 2200/221* (2013.01); *B62D 49/06* (2013.01)

(58) Field of Classification Search
USPC ........................... 290/1 C; 60/431; 56/16.4 R
See application file for complete search history.

(56) References Cited

U.S. PATENT DOCUMENTS 3,981,374 A * 9/1976 Johns, Jr. ............... B62D 59/04
180/14.3
4,406,633 A * 9/1983 Hamm ....................... B63J 3/02
192/69.91

(Continued)

FOREIGN PATENT DOCUMENTS

| DE | 10303050 A1 | 8/2004 |
| DE | 202011051915 U1 | 11/2011 |

(Continued)

OTHER PUBLICATIONS

European Search Report in foreign counterpart application No. 16167344.7 dated Jun. 9, 2016 (8 pages).

*Primary Examiner* — Pedro J Cuevas
(74) *Attorney, Agent, or Firm* — Taft Stettinius & Hollister LLP; Stephen F. Rost

(57) ABSTRACT

A generator unit is provided for attachment to an agricultural work vehicle with a gear module and a generator module. The gear for the driving of the generator module is connected in a drive system with the generator module, and the gear module and the generator module are hydraulically connected with one another via an integrated cooling and lubricating agent circuit.

15 Claims, 3 Drawing Sheets

(51) Int. Cl.
*B60K 25/00* (2006.01)
*B62D 49/06* (2006.01)

(56) References Cited

U.S. PATENT DOCUMENTS

| | | | | |
|---|---|---|---|---|
| 5,974,796 A * | 11/1999 | Ishikawa | ............... | E02F 9/2225 |
| | | | | 60/399 |
| 6,220,028 B1 * | 4/2001 | Ishikawa | ............... | E02F 9/2235 |
| | | | | 60/431 |
| 7,140,169 B2 * | 11/2006 | Ameye | .................... | A01F 29/14 |
| | | | | 56/10.2 J |
| 7,391,129 B2 * | 6/2008 | Chiao | ..................... | B60K 6/46 |
| | | | | 180/307 |
| 7,600,595 B2 * | 10/2009 | Harris | ..................... | B60K 6/32 |
| | | | | 180/65.28 |
| 7,631,719 B2 * | 12/2009 | Wenthen | ................ | B60K 6/365 |
| | | | | 180/243 |
| 7,861,537 B2 * | 1/2011 | Givens | .................... | F02B 63/04 |
| | | | | 290/1 A |
| 7,876,104 B2 * | 1/2011 | Tarasinski | ................ | B60D 1/62 |
| | | | | 180/168 |
| 7,921,950 B2 * | 4/2011 | Harris | ..................... | B60K 6/48 |
| | | | | 180/65.6 |
| 8,058,982 B2 * | 11/2011 | Crowe | ..................... | B60K 6/48 |
| | | | | 340/439 |
| 8,607,919 B2 * | 12/2013 | Shirao | ..................... | F04B 9/02 |
| | | | | 180/307 |
| 8,668,035 B2 * | 3/2014 | Bradley | ........... | G08G 1/096775 |
| | | | | 180/165 |
| 8,881,506 B2 * | 11/2014 | Nakamura | ............... | F04B 49/08 |
| | | | | 417/364 |
| 9,174,521 B2 * | 11/2015 | Welschof | ................ | B60K 6/12 |
| 9,267,590 B2 * | 2/2016 | Essig | ................ | B60K 17/356 |
| 9,441,347 B2 * | 9/2016 | West | ....................... | E02F 3/964 |
| 9,487,074 B2 * | 11/2016 | Bissontz | .................. | B60K 6/22 |
| 9,561,789 B2 * | 2/2017 | Nishi | .................... | B60K 6/485 |
| 9,776,615 B2 * | 10/2017 | Matsuzaki | ............ | B60K 6/485 |
| 2003/0172638 A1 * | 9/2003 | Ameye | ................... | A01F 29/14 |
| | | | | 56/16.4 R |
| 2007/0103002 A1 * | 5/2007 | Chiao | ..................... | B60K 6/46 |
| | | | | 307/10.1 |
| 2007/0267233 A1 * | 11/2007 | Wenthen | ................ | B60K 6/365 |
| | | | | 180/243 |
| 2008/0152517 A1 * | 6/2008 | Ishii | ....................... | A01D 69/02 |
| | | | | 417/423.5 |
| 2009/0305519 A1 * | 12/2009 | Tarasinski | ................ | B60D 1/62 |
| | | | | 439/35 |
| 2010/0052888 A1 * | 3/2010 | Crowe | ..................... | B60K 6/48 |
| | | | | 340/461 |
| 2010/0057280 A1 * | 3/2010 | Crowe | ..................... | B60K 6/48 |
| | | | | 701/22 |
| 2010/0057281 A1 * | 3/2010 | Lawyer | ..................... | G01D 7/02 |
| | | | | 701/22 |
| 2010/0065358 A1 * | 3/2010 | Harris | ....................... | B60K 6/48 |
| | | | | 180/65.265 |
| 2010/0089340 A1 * | 4/2010 | Givens | .................... | F02B 63/04 |
| | | | | 123/2 |
| 2011/0031050 A1 * | 2/2011 | Bradley | ........... | G08G 1/096775 |
| | | | | 180/65.22 |
| 2011/0192156 A1 * | 8/2011 | Sato | ....................... | E02F 9/2246 |
| | | | | 60/431 |
| 2011/0214423 A1 * | 9/2011 | Givens | .................... | F02B 63/04 |
| | | | | 60/626 |
| 2012/0201657 A1 * | 8/2012 | Donnelly | ................ | F02C 6/20 |
| | | | | 415/123 |
| 2012/0279203 A1 * | 11/2012 | Arai | ....................... | B01D 53/944 |
| | | | | 60/276 |
| 2013/0014500 A1 * | 1/2013 | Welschof | ................ | B60K 6/12 |
| | | | | 60/420 |
| 2013/0020968 A1 * | 1/2013 | Meyer | ...................... | H02K 7/11 |
| | | | | 318/10 |
| 2014/0148984 A1 * | 5/2014 | Nishi | .................... | B60K 6/485 |
| | | | | 701/22 |
| 2014/0225374 A1 * | 8/2014 | Collett | ................. | H02K 7/1807 |
| | | | | 290/1 A |
| 2014/0332294 A1 * | 11/2014 | Soma' | ....................... | B60K 6/26 |
| | | | | 180/65.245 |
| 2015/0039163 A1 * | 2/2015 | West | ....................... | E02F 3/964 |
| | | | | 701/22 |
| 2015/0135863 A1 * | 5/2015 | Dalum | .................... | B60K 25/00 |
| | | | | 74/11 |
| 2016/0046179 A1 * | 2/2016 | Bissontz | .................. | B60K 6/22 |
| | | | | 74/11 |
| 2016/0046278 A1 * | 2/2016 | Matsuzaki | ............ | B60W 10/10 |
| | | | | 701/22 |

FOREIGN PATENT DOCUMENTS

| | | |
|---|---|---|
| DE | 102011078192 A1 | 1/2013 |
| DE | 102011055192 | 5/2013 |
| EP | 2305021 A1 | 4/2011 |
| EP | 2592726 | 5/2013 |

* cited by examiner

GENERATOR UNIT

RELATED APPLICATION

This application claims the benefit of German Application Ser. No. 102015208077.3, filed on Apr. 30, 2015, which is hereby expressly incorporated by reference in its entirety.

FIELD OF THE DISCLOSURE

The present disclosure relates to a generator unit for attachment to an agricultural work vehicle with a gear module and a generator module.

BACKGROUND

The electrification of attached devices for agricultural work vehicles is the focus of many current developments. These developments are making available for a transitional period a so-called add-on generator unit for attachment to a work vehicle which can be obtained presently until after future development when work vehicles with integrated generator units are brought to the market.

Such an add-on generator unit is known from DE 10 2011 055 192 A1. An agricultural work vehicle with a PTO shaft such as, for example, a tractor can be equipped with the generator unit described therein so power consumers with a nominal voltage that differs from a nominal voltage of a work vehicle power network can be operated. Thus, an additional vehicle power network with a higher nominal voltage can be built. However, a description is not given as to how an electric control of the generator and the electric power consumer takes place.

SUMMARY

In view of these so-called add-on generator units, the present disclosure relates to a generator unit from which a control of the generator module and the electric power consumer can take place.

In this disclosure, a generator unit for attachment to an agricultural work vehicle includes a gear module and a generator module. The gear module for the driving of the generator module is connected in a drive system with the generator module, and the gear module and the generator module are hydraulically connected with one another via an integrated cooling and lubricating agent circuit. A power electronics system is also provided so as to control the operation of the generator module and an electric power consumer connected to the generator unit.

Only the structural integration of a power electronics system into the generator unit creates a self-sufficient unit that merely depends on a mechanical drive by the agricultural work vehicle. The generator unit in fact has a closed architecture of the power electronics system. The operation of the generator module and the operation of an electric power consumer can be controlled via the power electronics system.

A cooling circuit may also be provided for the cooling of the power electronics system. In particular, the cooling circuit for the power electronic system is provided within or on the generator unit. It can be a self-contained circuit.

In another embodiment, the cooling circuit of the power electronics system is designed as a water circuit. If it is designed as a self-contained circuit, a connection, for example, to a cooling circuit of the work machine can be dispensed with.

In an alternative embodiment, the cooling circuit may be designed as an oil circuit. In one example, the integrated cooling and lubricating agent circuit of the generator and of the gear and the cooling circuit of the power electronics system are joined in one circuit. In this way, there is the possibility for one circuit to hold only one fluid pump or one fluid cooler.

Moreover, at least one interface for the provision of an alternating voltage and at least one interface for the provision of a direct voltage to the electric power consumer may be provided.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
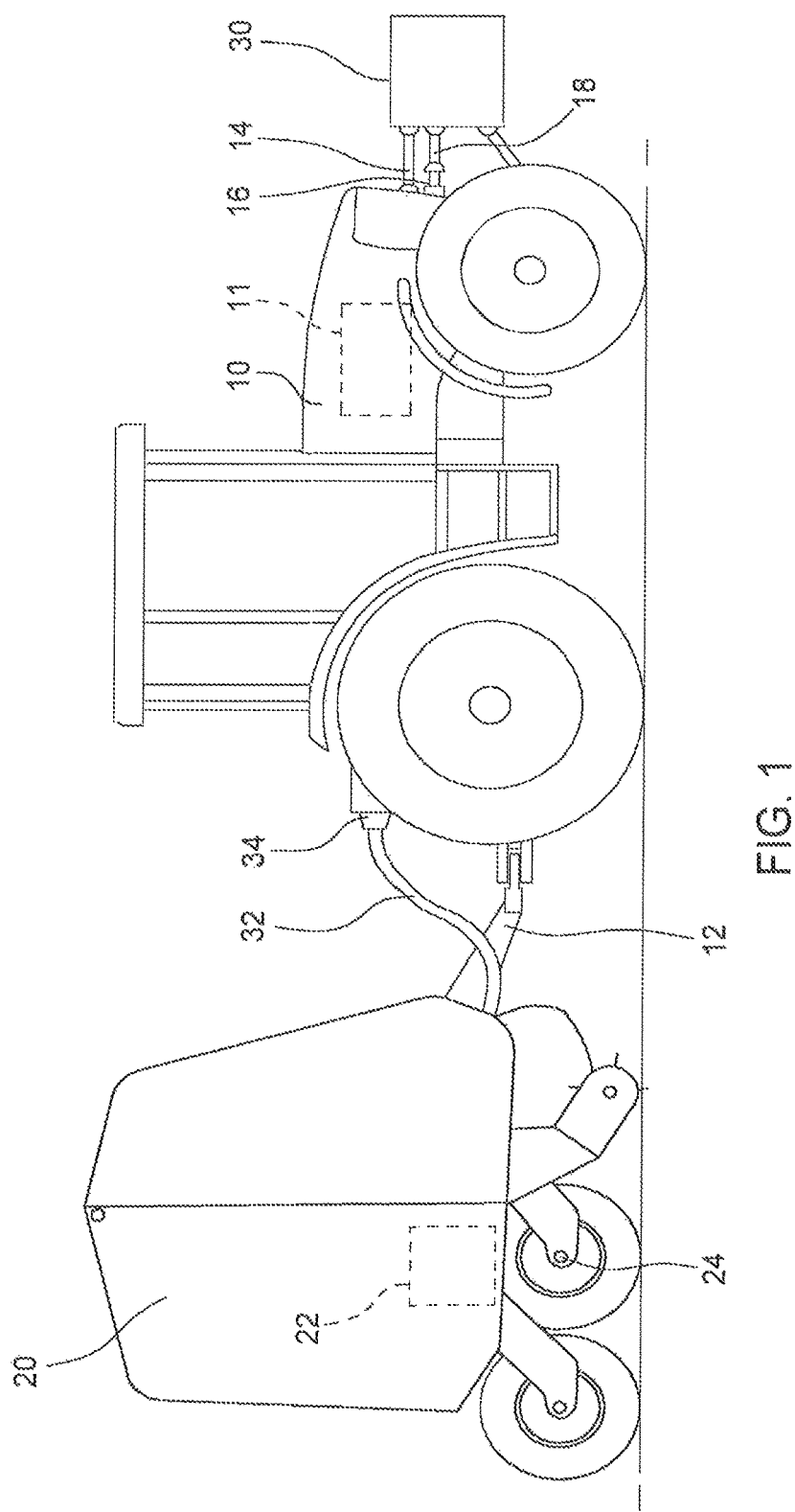
FIG. 1 is a schematic of an agricultural work vehicle with an attached device connected and a generator unit.

In one embodiment, FIG. 1 shows an agricultural work vehicle 10 in the form of a tractor which pulls, via a coupled tow bar 12, an attached device 20 in the form of a loader wagon. The work vehicle 10 is driven by an internal combustion engine 11 or a motor. Via a front three-point suspension 14, a generator unit 30 is added to the work vehicle 10. Alternatively, the generator unit 30 can also be located on the rear of the work vehicle via a three-point suspension. The generator unit 30 is connected in a drive system with a front PTO shaft 16 of the work vehicle 10 via an articulated shaft 18. The generator unit 30 can be driven by rotation of the PTO shaft 16 in order to produce electric power independent of the work vehicle 10 power network. The attached device 20 is also connected with the work vehicle 10 via an electric conductor 32 and a pluggable interface 34. Electric power produced by the generator unit 30 can be made available via a conduction means (not shown) on the work vehicle 10 to an electric consumer 22 of the attachment 20 device via the interface 34 and the electric conductor 32. In the present embodiment, the electric consumer 22 is designed as an electric motor to drive an axle 24 of the attached device 20.

It should be pointed out that the attached device 20 can also be a carried device, for example, in the form of a fertilizer distributor. Also, it is not inevitably necessary to have an axle driven with the electric consumer.

Figure 2:
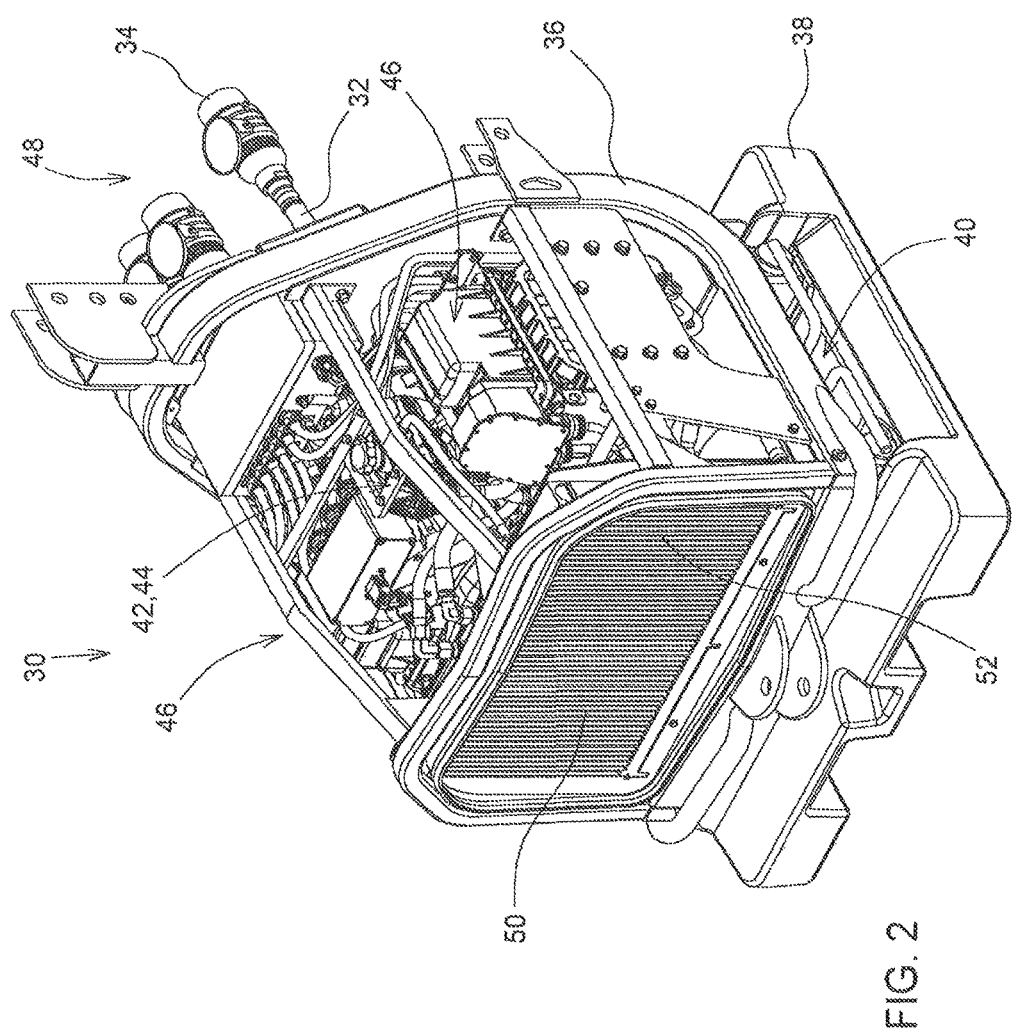
FIG. 2 is a schematic of a generator unit.
Figure 3:
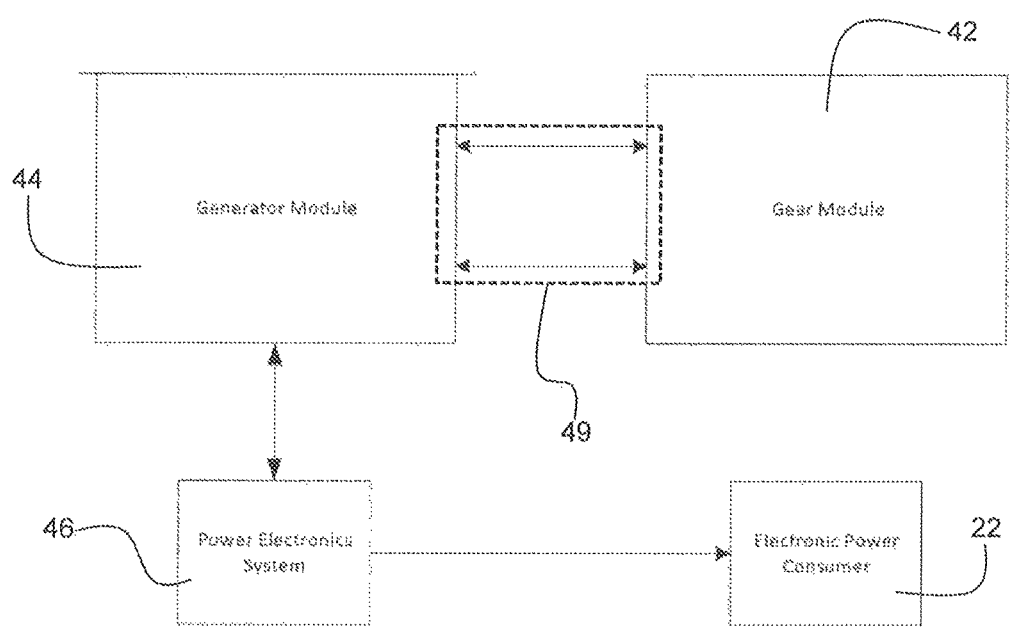
FIG. 3 is a schematic diagram of one embodiment of the present disclosure.

FIG. 2 shows the generator unit 30 depicted by itself. The generator unit 30 includes a frame 36 to hold various components. The frame 36 is hereby used both for the protection of the components and also, indirectly, for the affixing on the three-point suspension 14 of the work vehicle 10. The frame 36 can be designed as one unit or in several parts. Furthermore, the frame 36 can be used to hold a ballast weight 38. As depicted, a ballast weight 38 can be affixed to the frame 36 from below with a locking mechanism 40. The components of the generator unit 30 include a gear module 42, a generator module 44, a power electronics system 46, and cooling components.

The generator module 42 is designed for converting the speed of the PTO shaft to the speed required for the generator module 44. In one example, the gear module 42 has a fixed conversion and can be designed as a spur gear stage. The power electronics system 46 can include a converter with a DC intermediate circuit and control units for the generator module 44 and for the electric consumer 22 of the attached device 20. Furthermore, the power electronics system 46 has an arrangement consisting of high-voltage and control cable connections 48. The connections 48 can be hereby connected with the power electronics system 46 in such a way that both direct voltage and also alternating voltage can be made available.

An integrated cooling and lubricating agent circuit 49 is provided for the generator module 44 and the gear module 42. A heat exchanger 50 with a flow of ambient air is located in the front section of the generator unit 30. In addition, a cooling circuit for the cooling of the power electronics system 46 is provided. This cooling circuit can be designed as a water circuit and can include another heat exchanger 52 with a flow of ambient air in the front section of the generator unit 30. In an alternative development, both the cooling and lubricating agent circuit for the generator module 44 and the gear module 42 as well as the cooling circuit for the cooling of the power electronics 46 can be combined to form an of oil-based circuit. In this embodiment, the second heat exchanger 52 can be dispensed with.

The generator unit 30, in accordance with this disclosure, is connected with the attached device merely via the easily placed high-voltage and control cable connections 48. The generator unit 30 is designed to be rigid with the frame 36 so that impact loads are directly passed to the three-point suspension 14 of the work vehicle 10 and components of the generator unit 30 suffer no damage. In contrast to the arrangement described herein, the generator unit can also be placed in the rear section of the work vehicle 10. In addition, the generator unit 30 can be equipped with a towing device in order to push or pull a device.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A generator unit for attachment to an agricultural work vehicle, comprising:
a generator module coupled to a gear module, the generator module and gear module configured to be removably actively coupled to a PTO shaft of the work vehicle at a first coupler location;
an electric power consumer removably passively coupled to the work vehicle at a second coupler location and connected to the generator module; and
a power electronics system operably controlling an operation of the generator module and the electric power consumer.

2. The generator unit of claim 1, further comprising a cooling circuit for cooling the power electronics system.

3. The generator unit of claim 2, wherein the cooling circuit comprises a water circuit.

4. The generator unit of claim 2, wherein the cooling circuit comprises an oil circuit.

5. The generator unit of claim 4, further comprising an integrated cooling and lubricating agent circuit wherein the integrated cooling and lubricating agent circuit of the generator module, the gear module, and the cooling circuit of the power electronics system comprise one circuit.

6. The generator unit of claim 1, wherein at least one interface for the delivery of an alternating voltage and at least one interface for the delivery of a direct voltage are provided to the electric power consumer.

7. A work vehicle system, comprising:
a work vehicle having a PTO and a first coupler location and a second coupler location;
an electric power consumer removably passively coupled to the work vehicle at the first coupling location; and
a generator unit having a power electronics system, the generator unit being removably passively coupled to the work vehicle at the second coupling location;
wherein, the generator unit is removably actively coupled to the PTO to provide power to the power electronics system;
further wherein, the power electronics system selectively controls the electric consumer.

8. The work vehicle system of claim 7, further wherein the generator unit further comprises a frame that is removably coupled to the agricultural work vehicle via a three-point suspension.

9. The work vehicle system of claim 8, further wherein the generator unit further comprises a generator module coupled to the frame.

10. The work vehicle system of claim 8, further wherein a ballast weight is removably coupled to the frame.

11. The work vehicle system of claim 7, further wherein the electric power consumer is removably electrically coupled to the generator module with a pluggable interface and an electric conductor.

12. The work vehicle system of claim 7, further herein, the electric consumer is an electric motor that drives an axle of an attached device.

13. The work vehicle system of claim 7, further wherein the power electronics system has both high voltage and control cable connections coupled thereto.

14. The work vehicle system of claim 7, further wherein the generator unit further comprises an integrated cooling and lubricating agent circuit having a first heat exchanger.

15. The work vehicle system of claim 14, further comprising a second heat exchanger, wherein the first heat exchanger is fluidly coupled to a generator module and a gear module and the second heat exchanger is fluidly coupled to the power electronics system.

* * * * *